United States Patent
Tsuchitoi

[19]

[11] Patent Number: 5,870,534
[45] Date of Patent: *Feb. 9, 1999

[54] IMAGE PROCESSING APPARATUS AND METHOD

[75] Inventor: Naoki Tsuchitoi, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 806,341

[22] Filed: Feb. 26, 1997

[30] Foreign Application Priority Data

Feb. 29, 1996 [JP] Japan .................................. 8-042865

[51] Int. Cl.$^6$ ............................................. G06K 15/00
[52] U.S. Cl. ........................................... 395/115; 395/116
[58] Field of Search ..................... 395/101, 112, 395/114, 115, 116, 876, 877, 888; 345/507, 508, 509; 358/426, 261.4, 444; 382/232, 239

[56] References Cited

U.S. PATENT DOCUMENTS 5,377,312  12/1994  Kobayashi .............................. 395/116
5,604,846   2/1997  Kadota .................................... 395/115

*Primary Examiner*—Arthur G. Evans
*Attorney, Agent, or Firm*—Fitzpatrick, Cella, Harper & Scinto

[57] ABSTRACT

When image data of one page is to be generated at once, image data are developed in units of bands, compressed, and stored. Since print processing of the compressed image data takes a long time, compression is not performed until a necessity for compressing the image data arises. In case of short memory capacity for storing image data, a band including the minimum number of objects is selected from bands included in the page and compressed. If the memory capacity is insufficient even after the compression, a band to be compressed is selected from the uncompressed bands in a similar manner. The selected band image data is compressed, and the image data is stored in the free area. A band including the minimum number of objects is less likely to be overwritten with a new object as an image. For this reason, the procedures of expansion, overwriting, and recompression can be omitted. Therefore, print processing can be performed at a high speed.

42 Claims, 18 Drawing Sheets

IMAGE PROCESSING APPARATUS AND METHOD

BACKGROUND OF THE INVENTION

The present invention relates to an image processing apparatus and method which develops a bitmap image from, e.g., print information (page object) of one page.

Conventional image processing apparatuses of this type generate multivalued data at a high resolution. For this reason, the capacity of a print memory necessary for developing print information into a bitmap image increases, prolonging the processing time for development. To reduce the required memory capacity, a page is divided into a plurality of bands which are perpendicular to the paper conveyance direction, and bitmap image areas for just two bands, i.e., band memories, are ensured on the print memory. In print processing, a bitmap image in a band memory is transferred to the printer engine while a bitmap image of the next band is developed in another band memory. With this processing, image data can be output in units of pages without arranging any print memory for one page, resulting in cost reduction of the print processing unit. In addition, since development of a bitmap image in a band memory and transfer of a bitmap image from another band memory to the engine are simultaneously performed, the processing speed can be increased.

However, in an electrophotographic printing apparatus such as a laser beam printer, the print sequence by the printer engine can hardly be stopped during printing a page. For this reason, when a page is to be divided into bands, and development of a bitmap image and transfer of a bitmap image to the engine are to be performed in units of bands, development of the bitmap image of a band which is to be transferred next must be complete before the bitmap image of a band is completely transferred to the printer engine, i.e., a time limit is present. The print memory for storing a page object, i.e., print information of one page also has a limited capacity.

Information as the base for generating a bitmap image will be referred to as print information. The print information is described by, e.g., a page description language. An image element included in the print information will be referred to as an image object. Print information of one page, i.e., a group of image objects of one page will particularly be referred to as a page object.

In the conventional image processing apparatus, to cope with the above-described limitations, the print information generation unit predicts the time required for developing the respective divided band bitmap images. If the prediction result indicates that one of the bands cannot be developed within the time required for printing one band by the engine, or if the memory capacity necessary for the page object is larger than the capacity of the print memory, print processing is not performed in units of bands. Instead, an area for storing a bitmap image of one page is ensured in the print memory. After the bitmap image is completely developed from the page object of one page, the developed bitmap image is transferred to the engine. With this processing, print processing is guaranteed.

However, since a large memory capacity is required to store a bitmap image of one page on the print memory, the bitmap image are subjected to data compression in units of bands and stored. With this method, print processing is performed using a small memory capacity. More specifically, the bitmap image is printed in units of bands from the page object generated in the print memory, reversible data compression is performed for the developed bitmap image of each band (to be referred to as a band bitmap image hereinafter), and the compressed data is written in the print memory. Upon completion of development of one band, print information of this band is deleted, thereby increasing the usable area of the print memory. Bitmap images can be sequentially developed and continuously printed by using the usable area.

When the bitmap image of a band including a new object which is to be developed next has already been generated for another object and compressed, the compressed band bitmap image is temporarily expanded and reconstructed. The bitmap image of the object is overwritten on the reconstructed band bitmap image, and the band bitmap image is subjected to data compression again and written in the print memory.

When the print information of one page is completely printed as band bitmap images, the bitmap image data which is compressed in units of bands is expanded and transferred to the printer engine as a band bitmap image, and actually printed.

The first problem in the conventional image processing is as follows. If it is determined, for a page to be printed, that there is a band which cannot be developed within the time required for completely printing one band, print processing and data compression for the bitmap images of all bands of one page are performed even when the memory capacity is sufficient. Consequently, after the band bitmap image is generated and compressed, the compressed band must be expanded to print a new object on the band. When a data compression algorithm using a high compression ratio is used, compression/expansion processing requires a much longer time. Therefore, repetition of compression/expansion processing for all bands takes a long time, resulting in a decrease in overall throughput.

The second problem is that only reversible compression is used as a method of compressing a bitmap image. Generally, reversible compression or irreversible compression is used to compress image data. Print information such as a character image has a relatively small change in color. Therefore, in many cases, a satisfactory compression ratio can be obtained even with reversible compression such as run length encoding. However, for image information such as a natural image having a relatively large change in color, no high compression ratio can be obtained with reversible compression.

In irreversible compression represented by JPEG, a degradation in image quality is hardly visually recognizable for print information such as a natural image having a large change in color. Therefore, the compression ratio can be increased by using irreversible compression. On the other hand, for print information such as a character image, a degradation in edge due to irreversible compression is likely to be visually recognizable, so the irreversible compression cannot be used.

SUMMARY OF THE INVENTION

The present invention has been made in consideration of the above prior art, and has as its object to save the time required for compression/expansion processing and improve the efficiency of print processing in printing and outputting an image.

It is another object of the present invention to provide an image processing apparatus which generates image data of a page in units of bands obtained by dividing the page, comprising:

storage means having a predetermined memory capacity;

development means for developing image data of a band of interest and causing the storage means to store the image data;

compression means for compressing band image data stored in the storage means;

area ensuring means for causing the compression means to compress the band image data stored in the storage means until a sufficient capacity is obtained when a usable memory capacity of the storage means is insufficient for the image data of the band of interest; and output means for outputting image data of one page, which is stored in the storage means, after image data of all bands included in the page are generated.

It is still another object of the present invention to provide an image processing method for generating image data of a page in units of bands obtained by dividing the page by using storage means and output means, comprising:

a developing step of developing image data of a band of interest and causing the storage means to store the image data;

a compression step of compressing band image data stored in the storage means;

an area ensuring step of compressing the band image data stored in the storage means in the compression step until a sufficient capacity is obtained when a usable memory capacity of the storage means is insufficient for the image data of the band of interest; and an output control step of causing the output means to output image data of one page, which is stored in the storage means, after image data of all bands included in the page are generated.

It is still another object of the present invention to provide a computer readable memory which stores a program for generating image data of a page in units of bands obtained by dividing the page by using storage means and output means, comprising:

development code means for developing image data of a band of interest and causing the storage means to store the image data;

compression code means for compressing band image data stored in the storage means;

area ensuring code means for compressing the band image data stored in the storage means until a sufficient capacity is obtained when a usable memory capacity of the storage means is insufficient for the image data of the band of interest; and output control code means of causing the output means to output image data of one page, which is stored in the storage means, after image data of all bands included in the page are generated.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

[First Embodiment]

A printing system will be described as the first embodiment in which when all bands of one page are to be printed at once, instead of unconditionally compressing all the bands, bands to be compressed in case of short memory capacity are determined by assigning priority in accordance with a predetermined rule, and the determined bands are compressed and developed.

Figure 1:
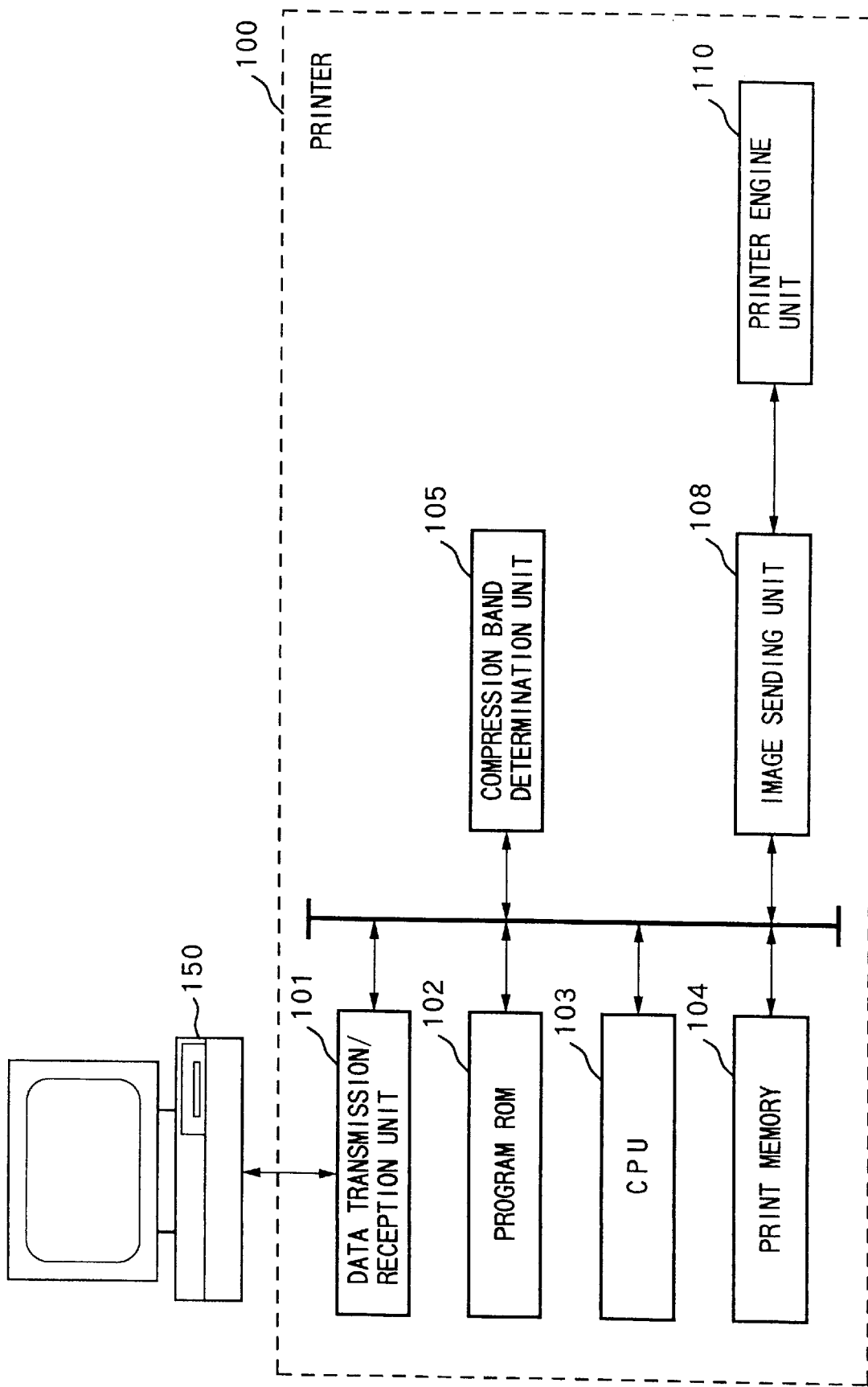
FIG. 1 is a block diagram showing an image processing apparatus according to the first embodiment of the present invention.

FIG. 1 is a block diagram for explaining the arrangement of a printing system having an image processing apparatus according to the first embodiment of the present invention. Referring to FIG. 1, a printer 100 comprises a data transmission/reception unit 101 which receives print information such as a control code or data transmitted from a host computer 150 or transmits status information, a CPU 103 for controlling the entire operation of the printer, a program ROM 102 which prestores a program describing the operation of the CPU 103, a print memory 104 for storing information for processing print information, a compression band determination unit 105 for determining whether a band bitmap image is to be compressed and stored or to be kept uncompressed and stored, an image sending unit 108 for transferring the band bitmap image written in the print memory 104 to a printer engine 110, and the printer engine 110 for actually printing the image.

The printer 100 generates a page object, i.e., data for developing a bitmap image on the basis of print information received from the host computer 150. If print information received from the host computer 150 is described by a page description language, the page object is generated as data described by an intermediate language which can be interpreted and executed by the printer.

Figure 2:
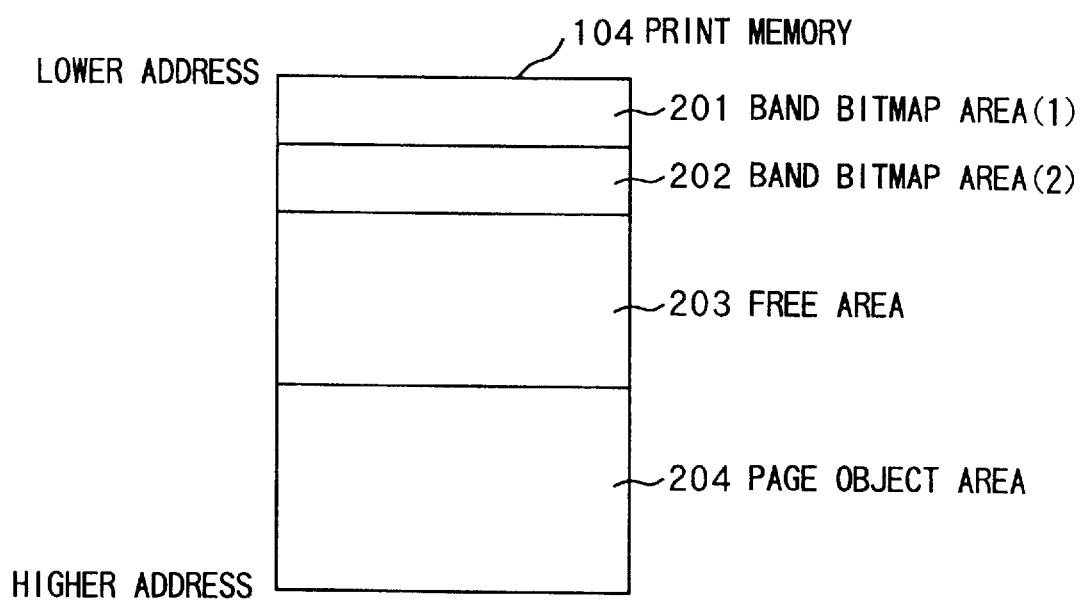
FIG. 2 is a schematic view showing the allocation of a print memory in a normal print mode.

FIG. 2 is a schematic view for explaining the contents of the print memory 104 in a normal print mode.

In the print memory 104, lower addresses are shown on the upper side, and higher addresses are shown on the lower side. No particular definition is made along the lateral direction.

In the normal print mode, bitmap areas for two bands are ensured in band bitmap areas 201 and 202 starting from the lower address side. Page objects are sequentially stored in the direction from the maximum address of the print memory to the lower address side, like a page object area 204. A free area 203 indicates a usable area.

Normally, the printer sequentially stores page objects in the page object area 204. Upon completion of storage of the page object of a page to be printed, a paper feeding operation is started. Image development processing is alternately performed in the band bitmap areas 201 and 202, and an image in one of the band bitmap areas is printed from the top of the page. At this time, the next band is developed in the band bitmap memory from which the image data has been sent to the printer engine 110 by the image sending unit 108. In this manner, image development and sending are performed for all the bands, thereby completing print processing of one page.

As in the prior art, in storing a page object, the print time is predicted in units of bands. If there is a band for which a development time longer than the print time for one page is required, the bitmap images of all bands constituting the page must be developed at once.

Figure 3A:
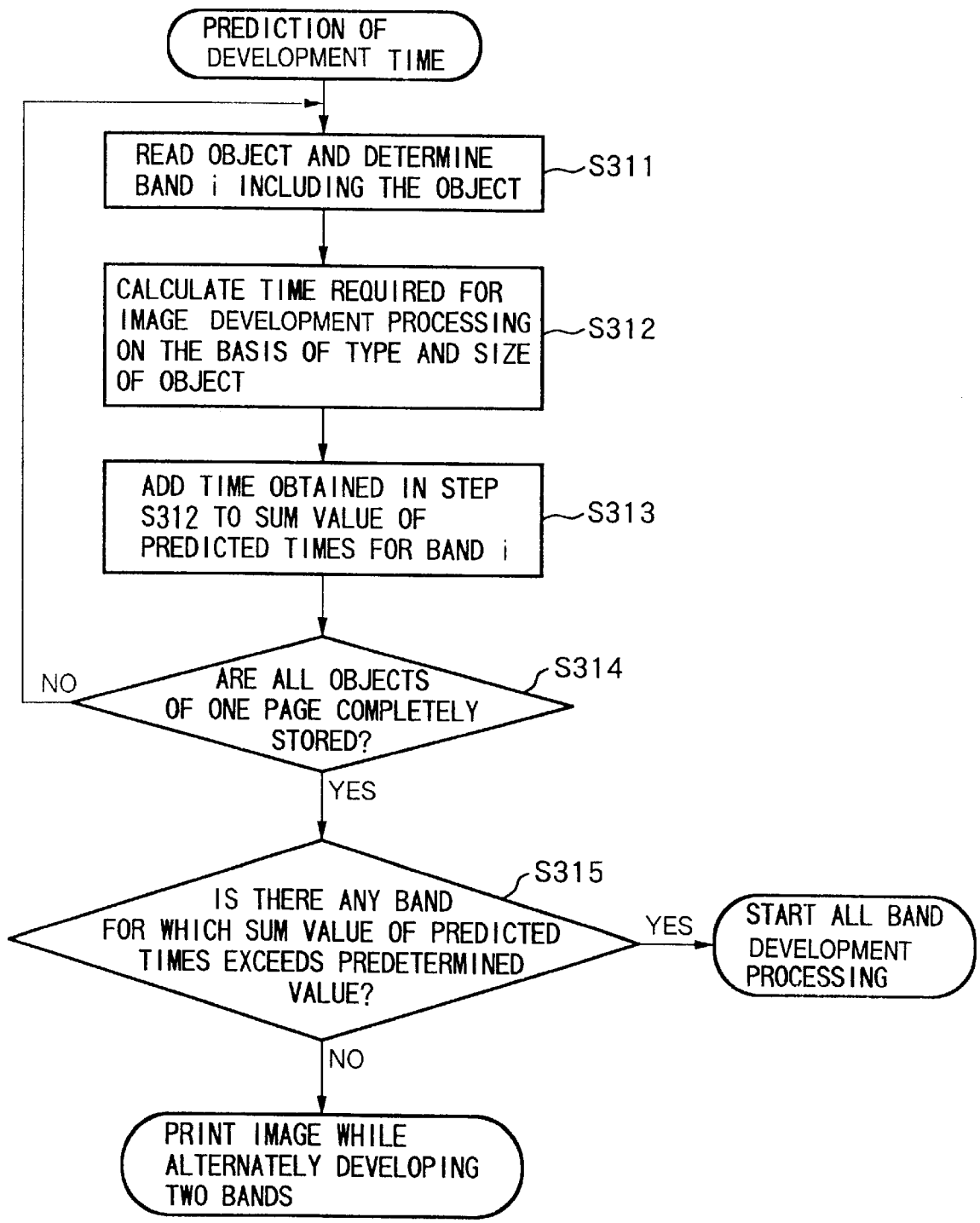
FIGS. 3A and 3B are flow charts for explaining an all band printing operation in the first embodiment.

FIG. 3A is a flow chart of procedures of predicting the development time for each band in storing the page object. This flow chart and the next flow chart (to be described later) are realized by causing the CPU 103 to execute a program stored in the program ROM 102.

In step S311, from data received by the data transmission/reception unit 101, objects included in a page to be printed are read one by one, and a band i including the objects is determined.

In step S312, the print time required for developing the object to a bitmap image is calculated on the basis of the type (image, graphic, or character) and size of the object. For example, a basic time according to the type of object is determined in advance, and the time is calculated by multiplying the basic time with the size. For characters, the number of characters may be used in place of the size.

In step S313, the time calculated in step S312 is added to the sum value of the predicted times for the band i.

In step S314, it is determined whether all objects of one page are completely stored. If NO in step S314, the next object is read. If YES in step S314, the flow advances to step S315 to determine whether there is a band for which the sum value of the predicted times exceeds a predetermined value. If YES in step S315, the flow advances to the procedures of starting an all band developing operation shown in FIG. 3B. If NO in step S315, the procedures of printing the image while alternately developing two bands is executed.

Figure 3B:
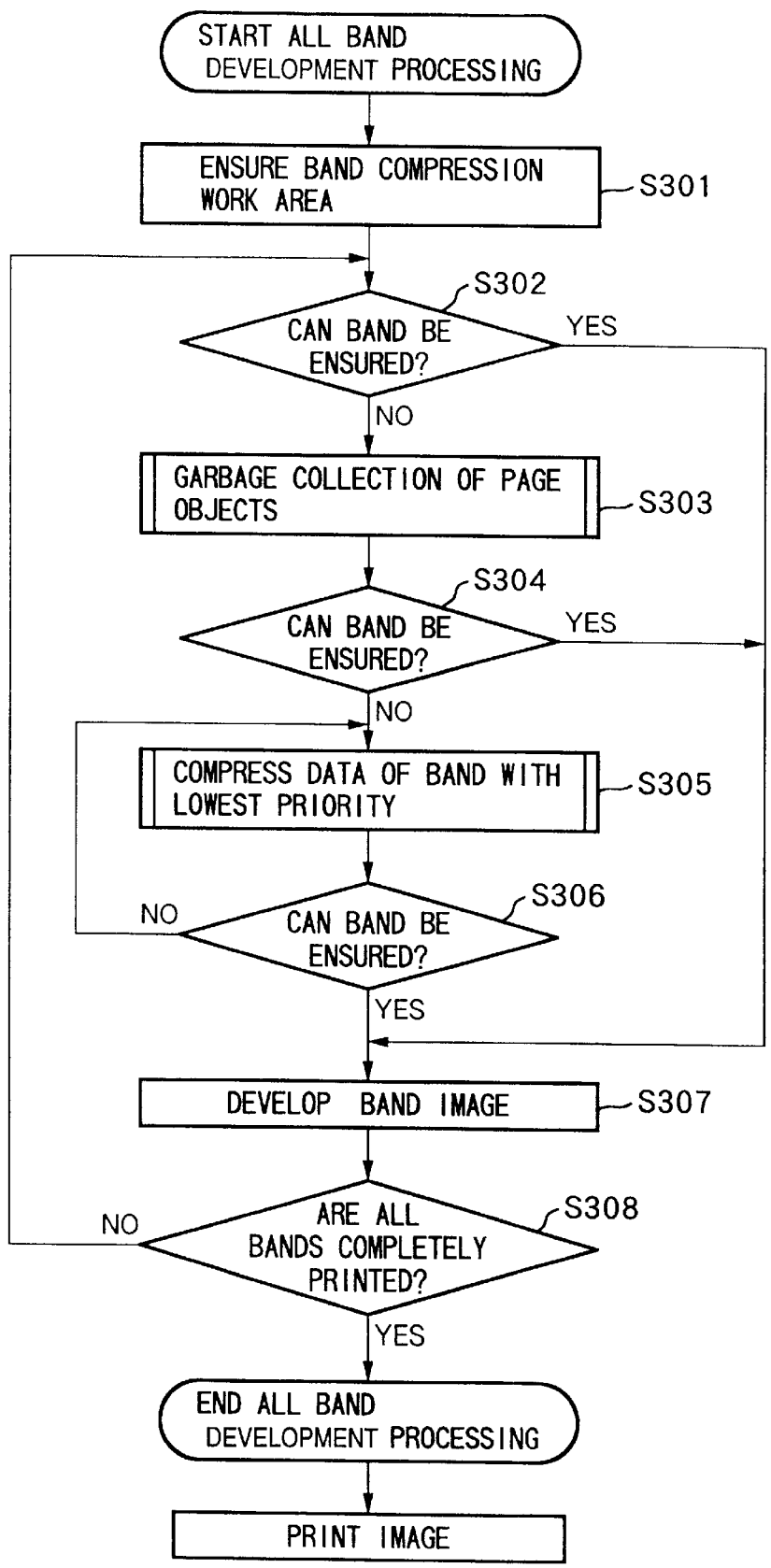
Figure 4:
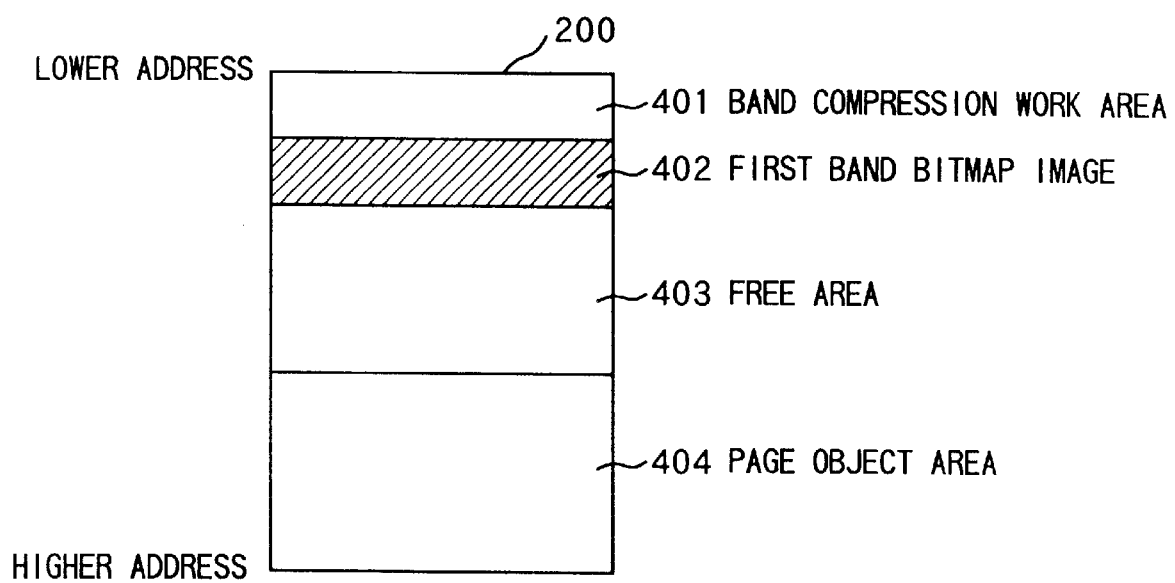
FIG. 4 is a schematic view showing the allocation of the print memory which is set when a band can be immediately ensured in the first embodiment.

FIG. 3B is a flow chart for explaining the control of all band development processing in the first embodiment. FIG. 4 is a schematic view for explaining the memory allocation of the print memory which is set upon completion of development processing of band 1. Step S305 in FIG. 3B and the procedures of the flow chart in FIG. 8 indicate processing by the compression band determination unit 105. Processing by the compression band determination unit 105 can also be realized by the CPU 103.

When all band development processing is started, a work area 401 for band compression is ensured first in step S301. An area with the same size as that of an uncompressed band bitmap area is ensured in consideration of the worst value in case compression is impossible. In step S302, it is checked whether an area for storing an uncompressed band bitmap image is ensured in the free area of the print memory. If YES in step S302, image development processing of the first band is performed in step S307, thereby generating a bitmap image 402 of the first band. If NO in step S302, an unnecessary object is discarded from the memory in step S303 to generate a free area, i.e., perform garbage collection of page objects is performed.

Figure 5A:
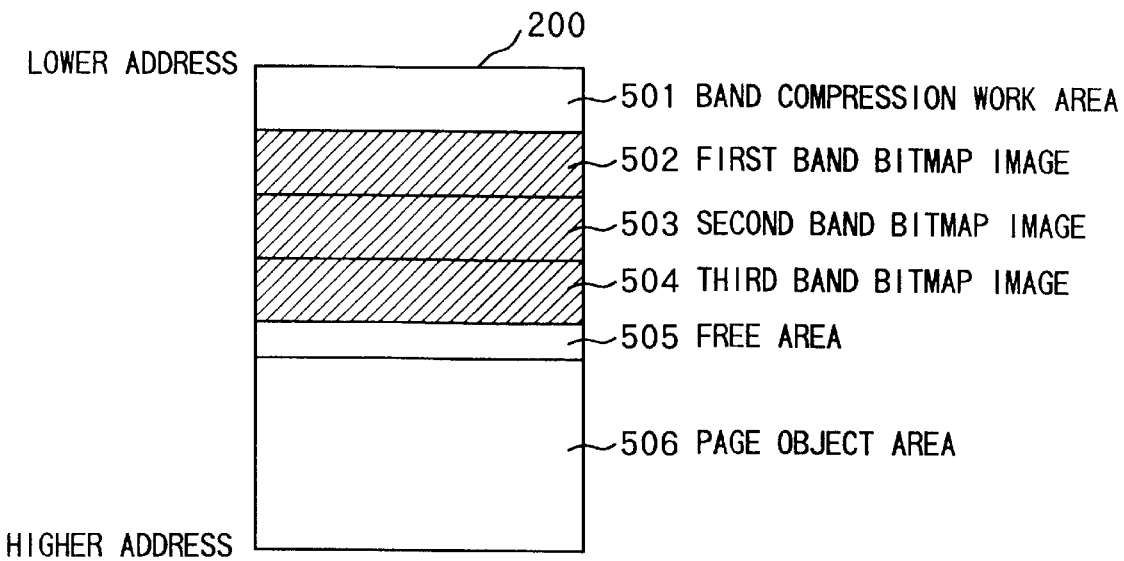
FIGS. 5A and 5B are schematic views showing the allocations of the print memory which are set when a band can be ensured in the first embodiment.

FIG. 5A is a schematic view showing the memory allocation of the print memory which is set when an area for an uncompressed band bitmap image can be ensured. When an area for the fourth band cannot be ensured because the size of a free area 505 is smaller than that of the fourth band, garbage collection of page objects is performed to extend the free area.

Figure 6:
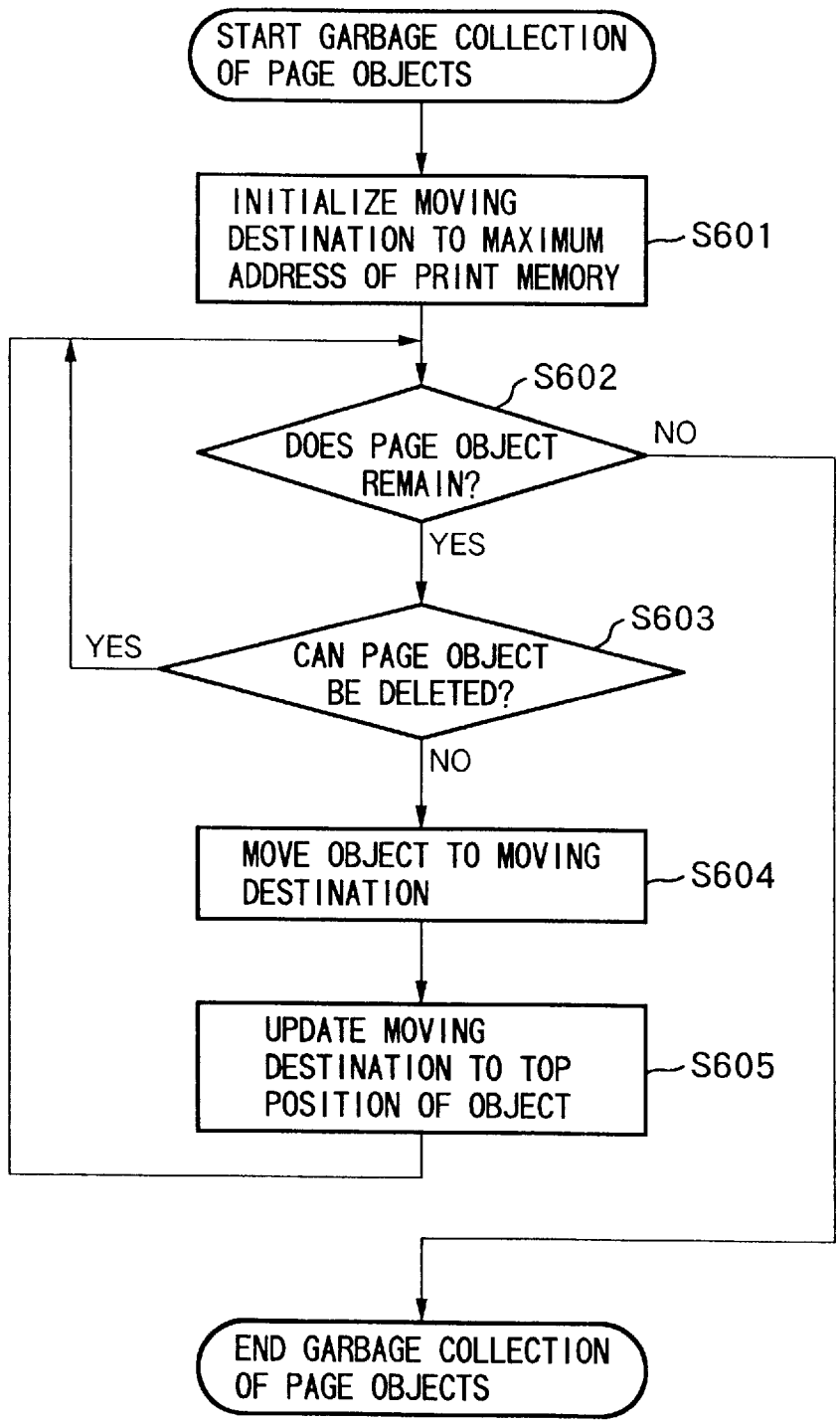
FIG. 6 is a flow chart of garbage collection processing of a page object area in the first embodiment.

FIG. 6 is a flow chart for explaining the procedures of garbage collection of page objects in step S303. In step S601, the moving destination address of objects is set at the maximum address of the print memory. In step S602, it is determined whether movement of objects of one page is complete. If YES in step S602, garbage collection is ended. If, in step S603, the object belongs to only a band which has already been developed and will not be printed anymore, it is determined that the object can be deleted. The object is neglected, and the flow returns to step S602.

If the object is still going to be used for image development processing again, the object is moved to the moving destination address in step S604. In step S605, the moving destination address is updated to the start position of the moved page object.

Figure 5B:
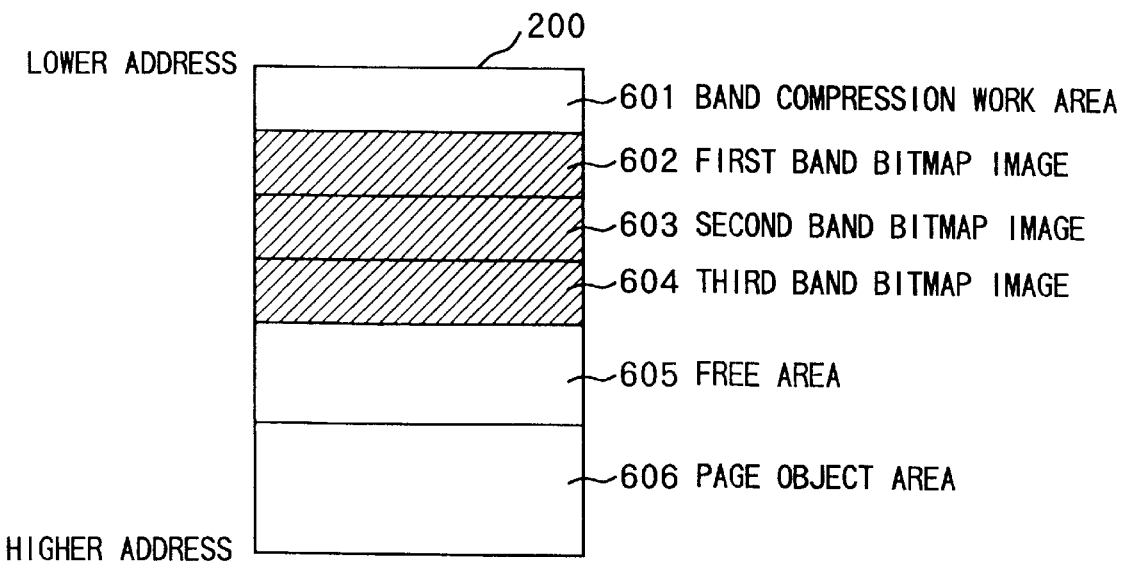

By repeating the above processes, movement of all page objects is completed. Only necessary page objects are stored in the page object area again, thereby completing garbage collection. FIG. 5B is a schematic view showing the memory allocation of the print memory 104 which is set when garbage collection of page objects is complete. Since the size of a page object area 606 is reduced, a free area 605 is extended relative to the page object area 606, so that the bitmap area for the fourth band can be ensured.

Figure 7:
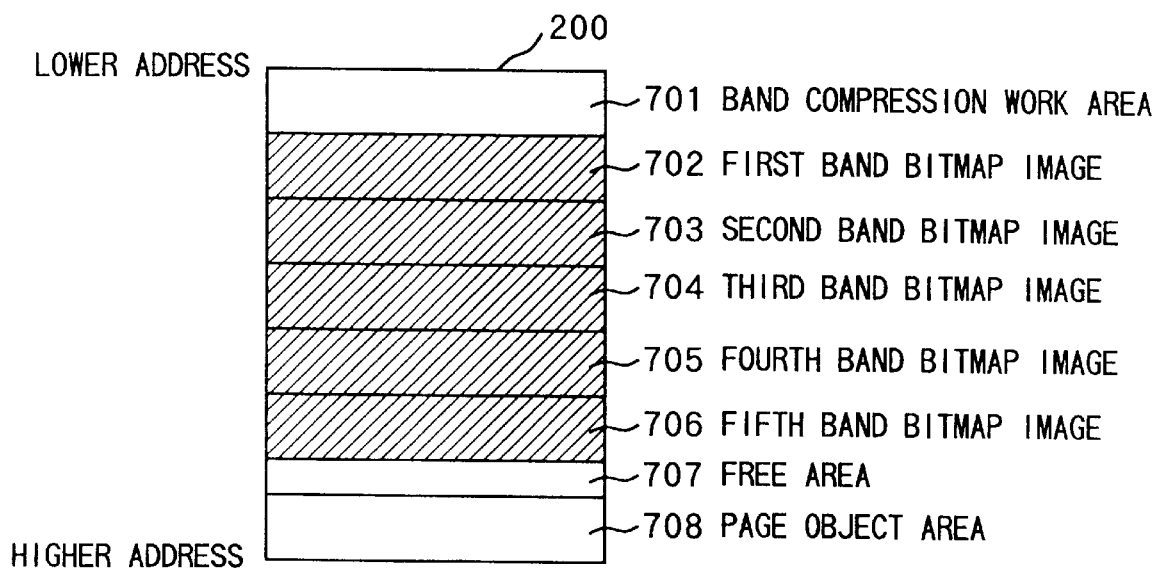
FIG. 7 is a schematic view showing the allocation of the print memory, indicating that a band cannot be ensured even after garbage correction of the page object is performed in the first embodiment.

When a sufficient free area is ensured in step S303, a band bitmap image is developed in the free area in step S307. FIG. 7 is a schematic view showing the memory allocation of the print memory in which the fourth and fifth bands are developed after garbage collection of page objects.

In step S304, it is determined whether an area for an uncompressed band bitmap image cannot be ensured even after garbage collection. If NO in step S304, a band with lowest priority is compressed to reduce the size of the bitmap image, thereby ensuring a new area for a band bitmap image. It is unlikely that new objects will be developed later on a band including a few objects. Using this fact, the band including the minimum number of objects to be developed is defined as a band with lowest priority. This band with lowest priority is defined as a band to be compressed.

Figure 8:
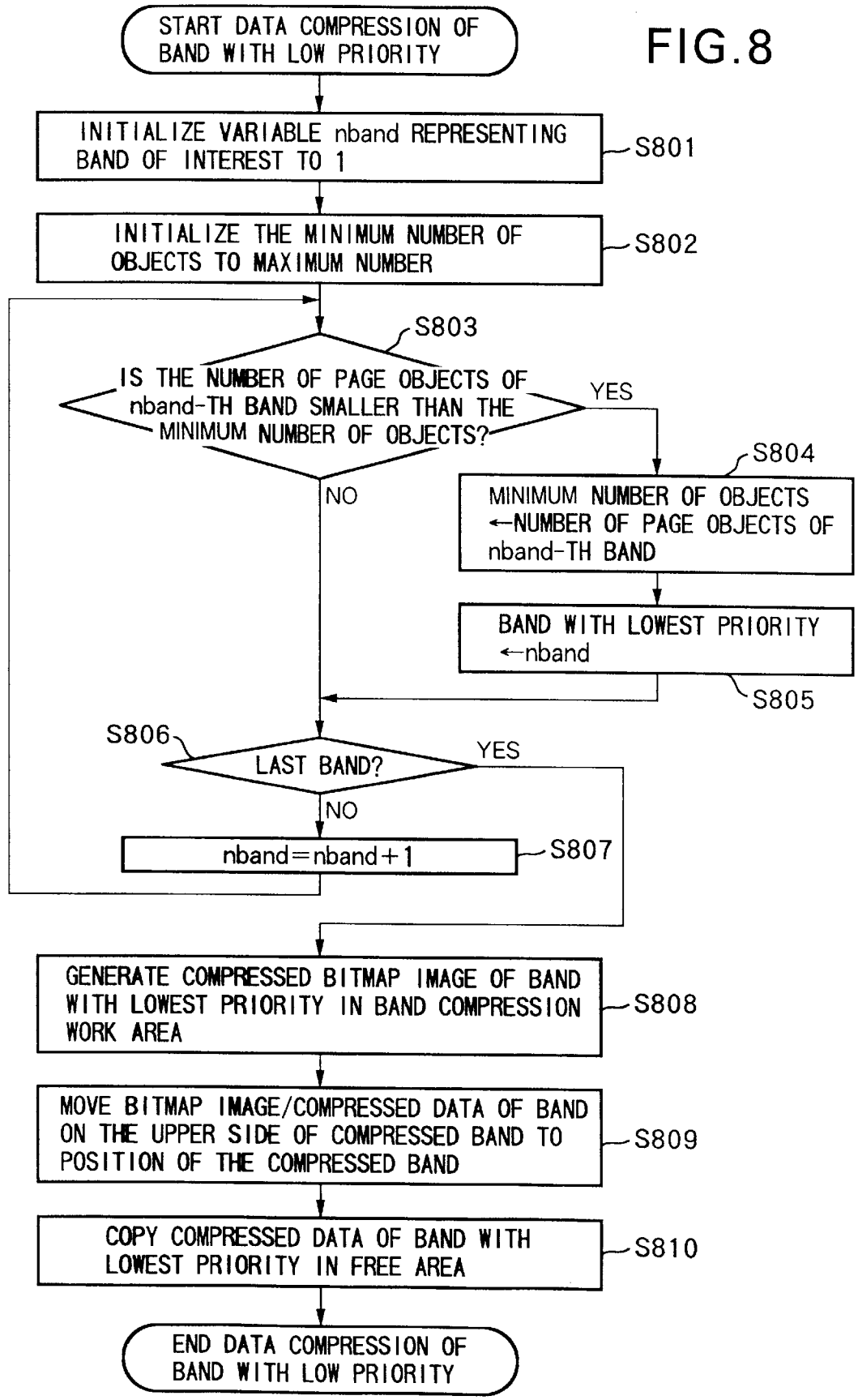
FIG. 8 is a flow chart for explaining processing of compressing data of a band with low priority in the first embodiment.

FIG. 8 is a flow chart for explaining the procedures of compressing data of the band with lowest priority.

In step S801, a value "1" representing band 1 is set for initialization as a variable nband indicating a band of interest. In step S802, the minimum number of objects is set to be maximum number. As this value, the number of page objects included in one page or the maximum value the variable can take may be set.

In step S803, it is determined whether the number of objects included in the nband-th band is smaller than the minimum number so far. If YES in step S803, the minimum number of objects at that time is updated to the number of objects included in the nband-th band in step S804. The band of interest at that time is registered as a band with lowest priority at that point of time in step S805. By performing the above processes for all bands, bands to be compressed are determined when the control advances to step S808.

Assume that the third band is a band with lowest priority. In step S808, the bitmap image of the third band is subjected to data compression and written in a band compression work area 701 shown in FIG. 7. A bitmap area 704 of the compressed band is added to the free area. In step S809, the bitmap image (including compressed data) of a band located at an address on the higher side of the compressed band is moved to fill the free area. In this case, the fourth and fifth bitmap images are moved to fill the area 704 where the third band bitmap image before compression has been present.

Finally, in step S810, compressed data written in the band compression work area 701 is written in the free area.

Figure 9:
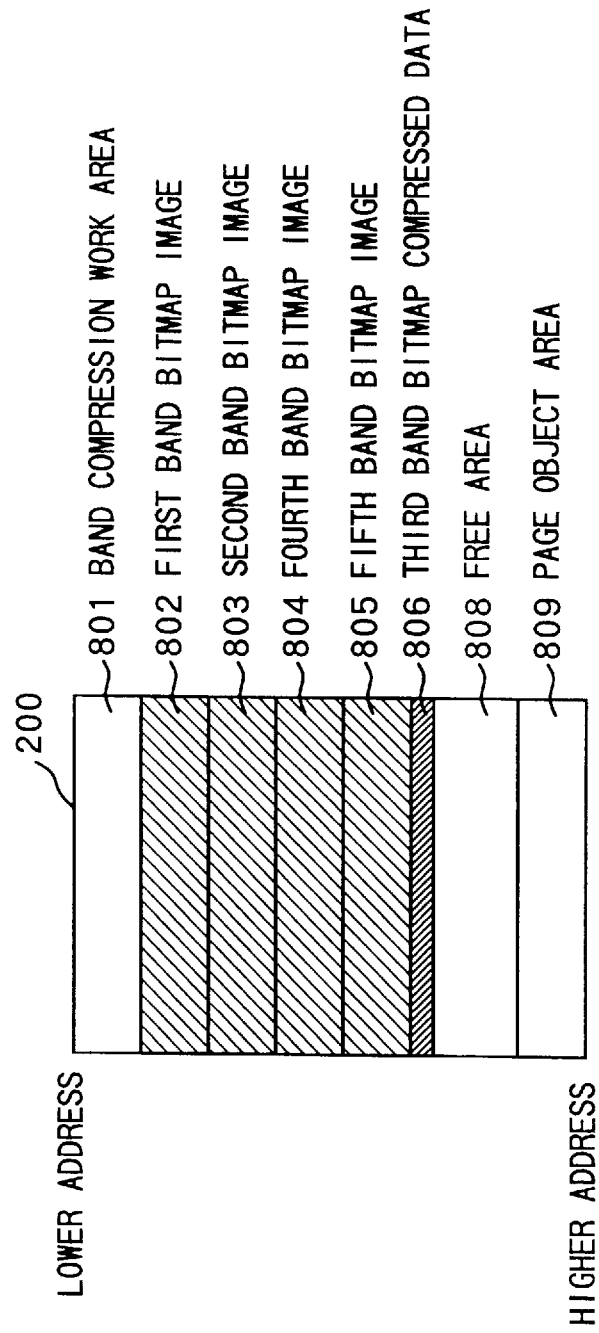
FIG. 9 is a schematic view showing the allocation of the print memory, indicating that a band can be ensured by data compression of a band with low priority in the first embodiment.

FIG. 9 is a schematic view showing the memory allocation of the print memory which is set when the third band is compressed. Since the free area is extended by compression, an area for the bitmap image of the sixth band is ensured in a free area 808. If the area cannot be ensured, a band with lowest priority of uncompressed bands is subjected to compression. These processes are repeated until a necessary area can be ensured.

The above processing is performed every time all bands are printed. For this reason, bands with low priority are compressed, and bands with high priority are stored without being compressed.

If the bitmap image of a certain band is compressed and stored, the band is called a compressed band; otherwise, the band is called as an uncompressed band.

Re-development processing of an object which is generated after all bands have been developed (processing of developing an object on a band bitmap image which has already been developed) will be described next.

Figure 10:
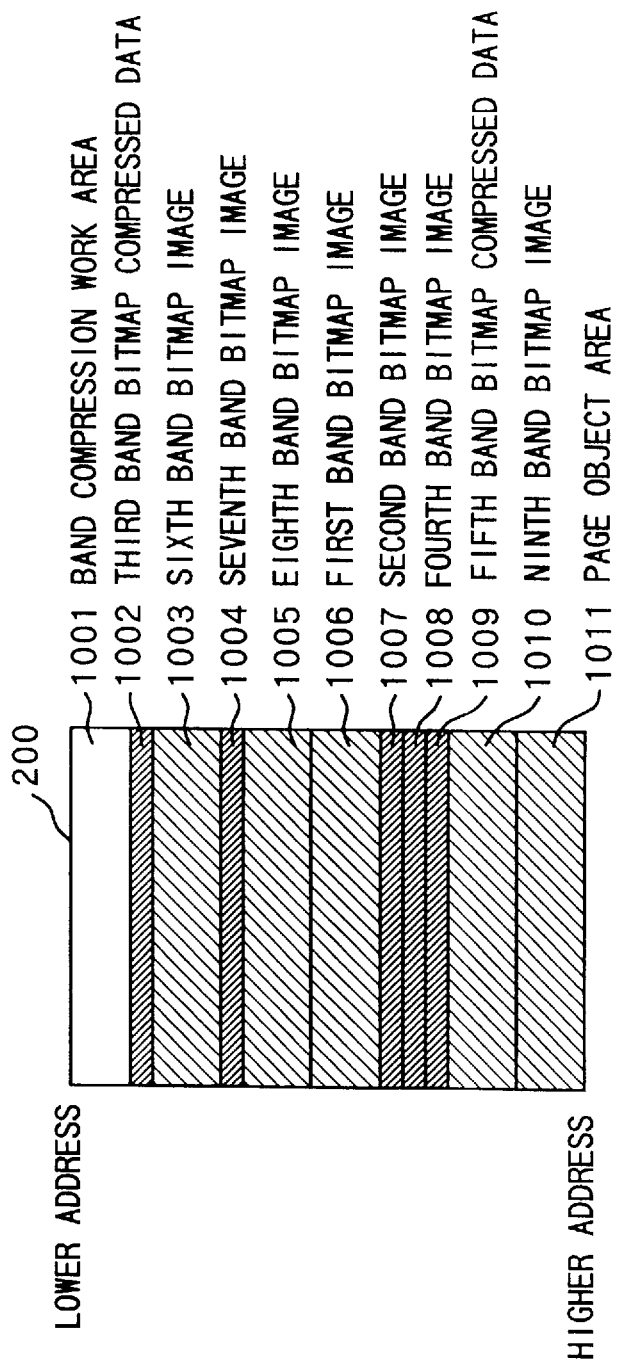
FIG. 10 is a schematic view showing the allocation of the print memory which is set when all bands are completely developed, and a page object prepared subsequently is to be re-developed in the first embodiment.

FIG. 10 is a schematic view showing the memory allocation of the print memory which is set when an object which is generated after all bands have been developed is to be re-developed. The first, sixth, eighth, and ninth bands are stored without being compressed, and the remaining bands are compressed and stored. An unprocessed page object is stored in a page object area 1011.

In this case, to guarantee an area in re-developing processing, image development processing is performed from an uncompressed band.

Figure 11:
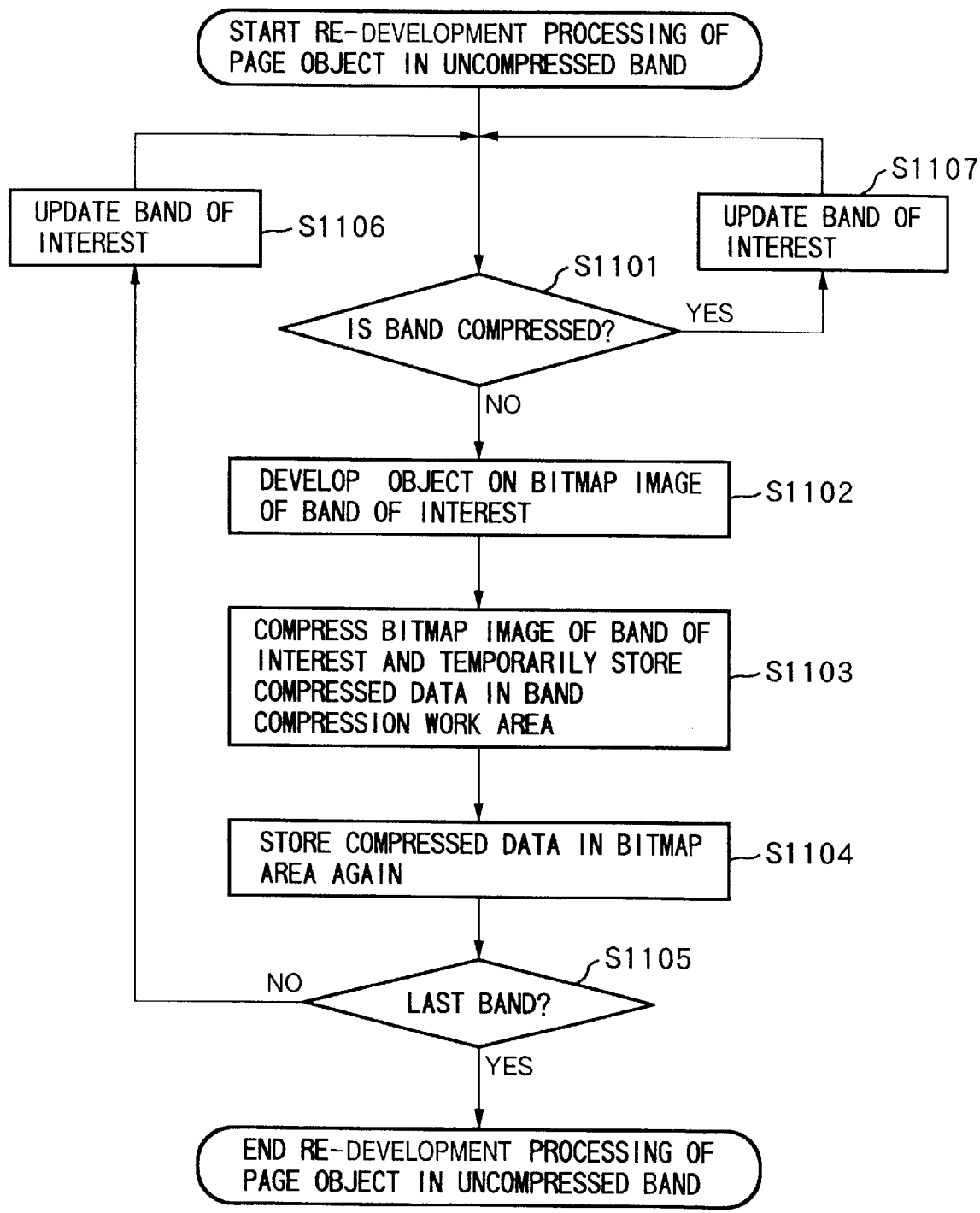
FIG. 11 is a flow chart for explaining re-development processing of a page object on an uncompressed band in the first embodiment.

FIG. 11 is a flow chart of re-development processing of objects in an uncompressed band. In step S1101, compressed bands are simply neglected, and only uncompressed bands are processed. For an uncompressed band, a page object is re-developed on the bitmap image area of the band in step S1102. In step S1103, the bitmap image of a band of interest is compressed, and the compressed data is temporarily stored in a band compression work area 1001. The compressed data is stored in an area where the uncompressed bitmap image of the band has been present. When development processing is performed for all uncompressed bands, re-development processing of compressed bands is performed next.

Figure 12:
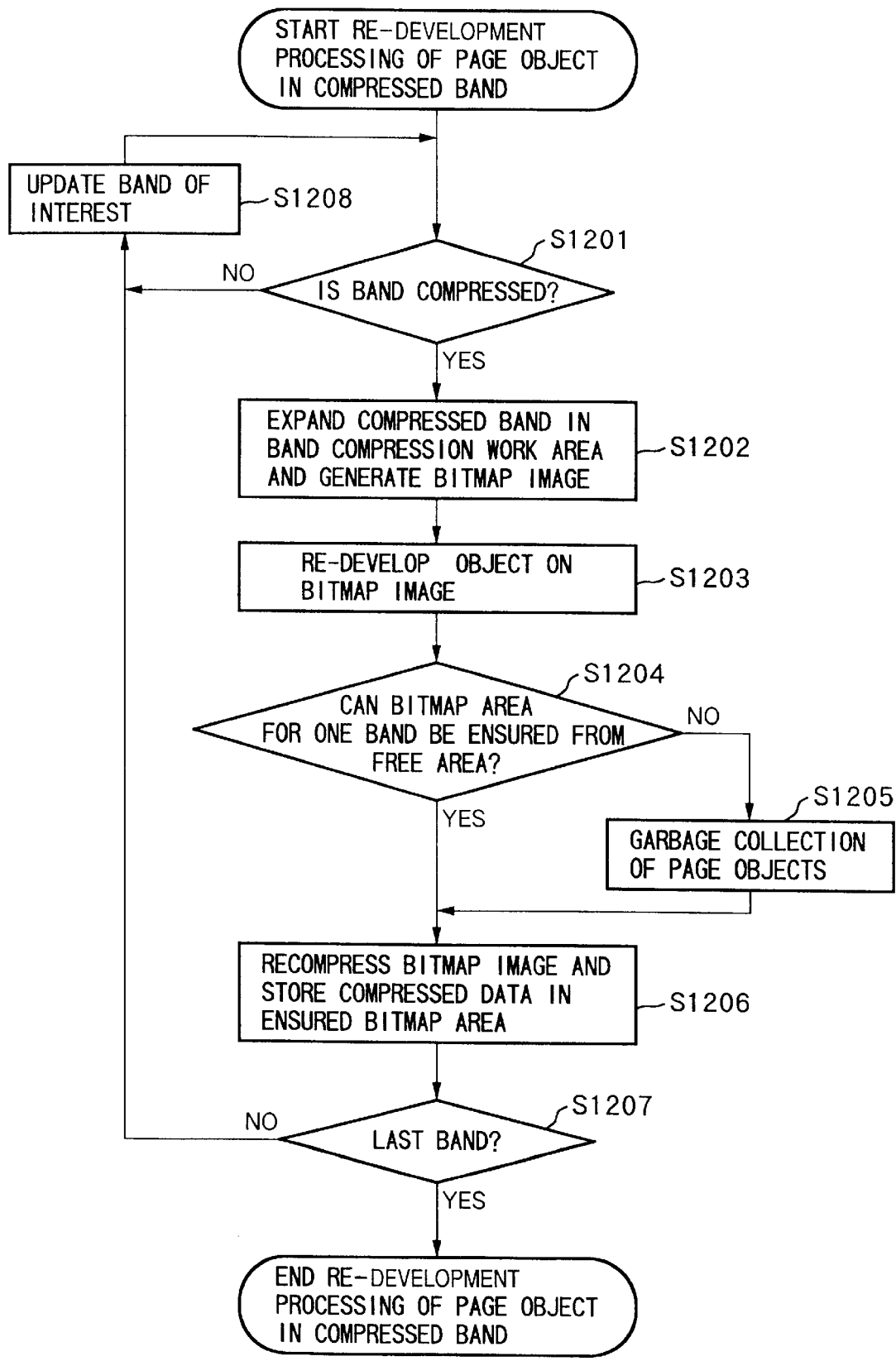
FIG. 12 is a flow chart for explaining re-development processing of a page object on a compressed band in the first embodiment.

FIG. 12 is a flow chart of re-development processing of a page object in a compressed band. In step S1201, uncompressed bands are simply neglected, and only compressed bands are processed. In step S1202, the compressed bitmap data of the band of interest is expanded and written in the band compression work area. In step S1203, the object is developed in the expanded bitmap area. To recompress and store the printed bitmap image, checking for a free area is performed in step S1204. If there is no free area, garbage collection of page objects and band bitmap areas is performed in step S1205 to extend the free area. When a free area is obtained, the re-development bitmap image is recompressed and stored in the ensured free area in step S1206.

With the above re-development processing, the bitmap images of all bands are compressed and stored, expanded again before they are transferred to the printer engine, and printed.

When the bitmap images in one page are to be developed at once, and a band bitmap image is to be compressed because of short memory area, a band which is unlikely to be re-developed is selected and compressed. For this reason, re-development processing can be performed at a higher speed, resulting in an increase in efficiency of print processing.

[Second Embodiment]

A printing system using irreversible compression procedures will be described as the second embodiment.

Figure 13:
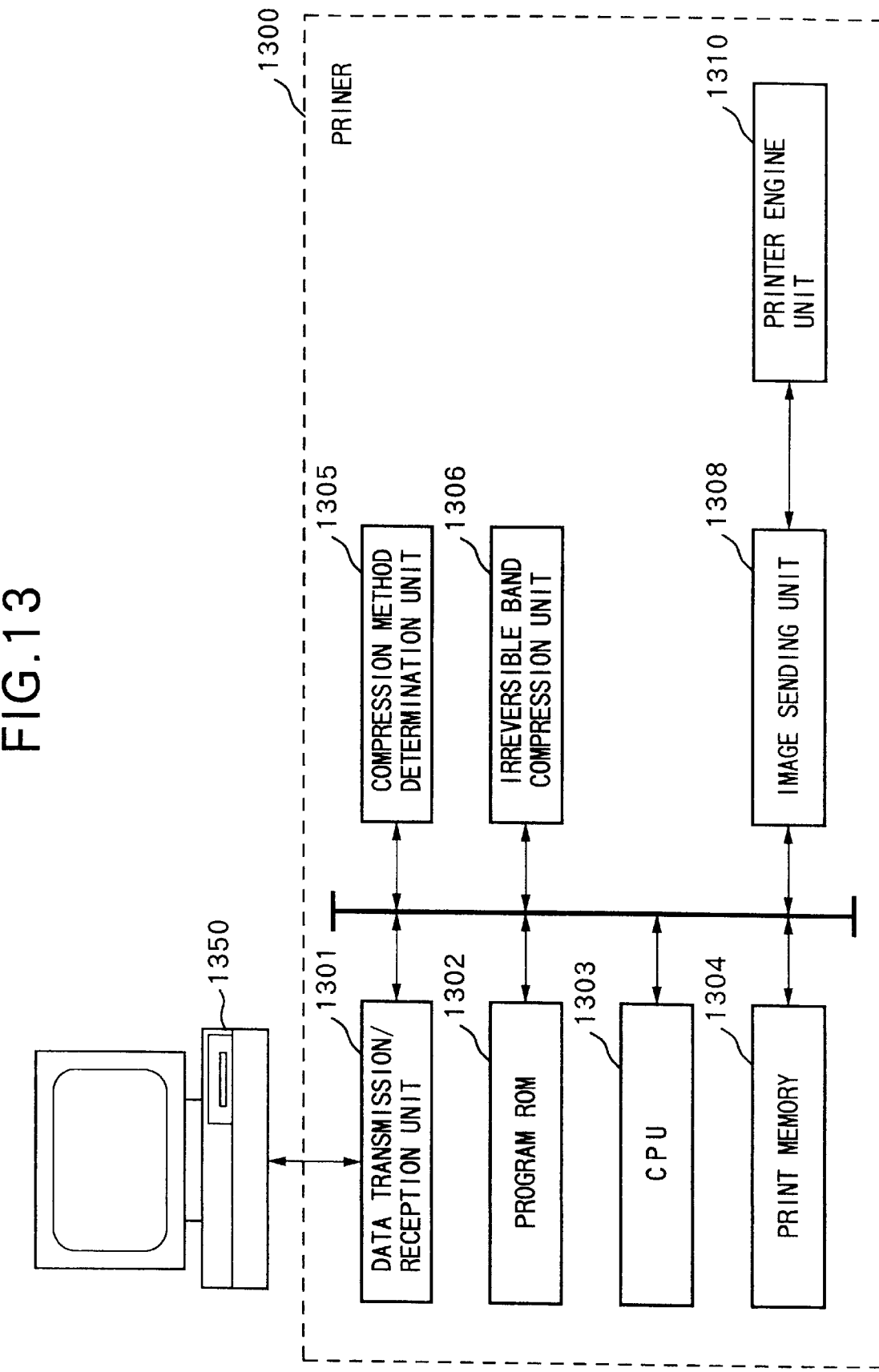
FIG. 13 is a block diagram showing an image processing apparatus according to the second embodiment of the present invention.

FIG. 13 is a block diagram of a printing system having an image processing apparatus according to the second embodiment of the present invention. The apparatus of this embodiment selectively uses irreversible compression and reversible compression to improve the compression ratio and processing efficiency. In this apparatus, bands are classified into bands subjected to reversible compression and bands subjected to irreversible compression. If the bitmap image of a certain band must be compressed, compression is performed in accordance with the type of band.

Referring to FIG. 13, a host computer 1350 uses a printer 1300. The printer 1300 comprises a data transmission/reception unit 1301 which receives print information such as a control code or data transmitted from the host computer 1350 or transmits status information, a CPU 1303 for controlling the entire operation of the printer, a program ROM 1302 which prestores a program describing the operation of the CPU 1303, a print memory 1304 for storing information for processing print information, a compression method determination unit 1305 for determining whether an object is to be developed in a reversible compression band area or in an irreversible compression band area in the print memory 1304 when a page object is to be generated, an irreversible band compression unit 1306 which performs irreversible compression when a band bitmap image is to be compressed, an image sending unit 1308 for transferring a band bitmap image developed in the print memory 1304 to a printer engine 1310, and the printer engine 1310 for actually printing the image. The compression method determination unit 1305 and the irreversible band compression unit 1306 can also be realized by causing the CPU 1303 to execute a program stored in the program ROM 1302.

Figure 14:
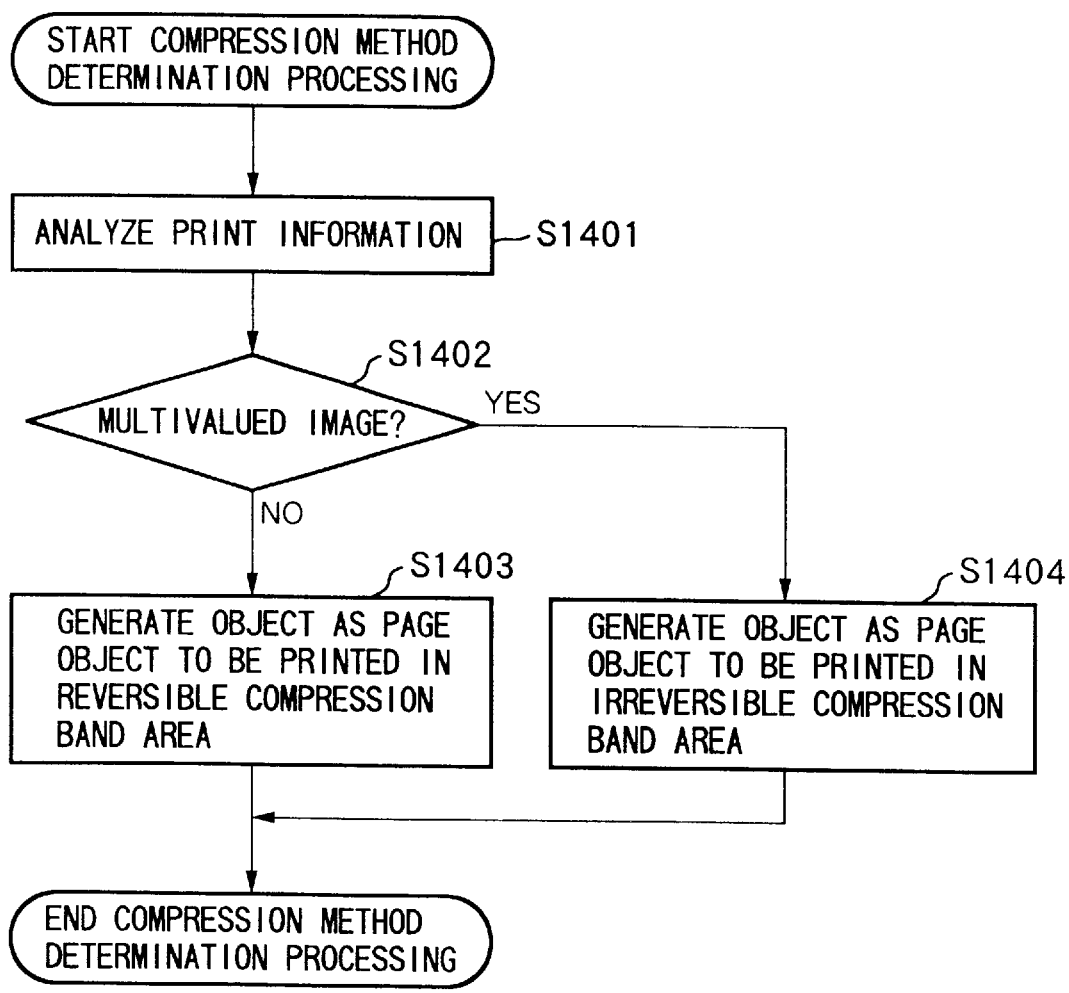
FIG. 14 is a flow chart for explaining processing of determining the band to be developed in generating a page object in the second embodiment.

FIG. 14 is a flow chart for explaining compression method determination processing in which, when a page object is to be generated from print information, it is determined whether the objects in the page are developed in the reversible compression band area or in the irreversible compression band area. Using the fact that a degradation in gradation image is less notable to the human eye even when irreversible compression is performed, irreversible compression is performed for a multivalued gradation image. This processing is performed by the compression method determination unit 1305.

In step S1401, print information is analyzed. If it is determined in step S1402 that the print information is a multivalued image having gradation, a object to be printed in the irreversible compression band area is generated from the print information in step S1404. If it is determined that the print information is not a multivalued image, a object to be printed in the reversible compression band area is generated in step S1403.

More specifically, bands are classified into two types, i.e., bands subjected to reversible compression and bands subjected to irreversible compression, and an object is generated according to the classification in units of bands including objects.

If multivalued images and binary images such as characters are simultaneously present, the multivalued images have priority over the binary images. More specifically, once a band is classified as an irreversible compression band, the band never becomes a reversible compression band even when the band includes a binary image. Conversely, when a band is classified as a reversible band, and thereafter, it is found that the band includes a multivalued image, the band is reclassified as an irreversible band.

As in the first embodiment, the image development time is predicted in units of bands in generation of a page object. If a band for which a image development time longer than the paper conveyance time is required is found, an area for storing all band bitmap images must be ensured to develop the band bitmap image.

Figure 15:
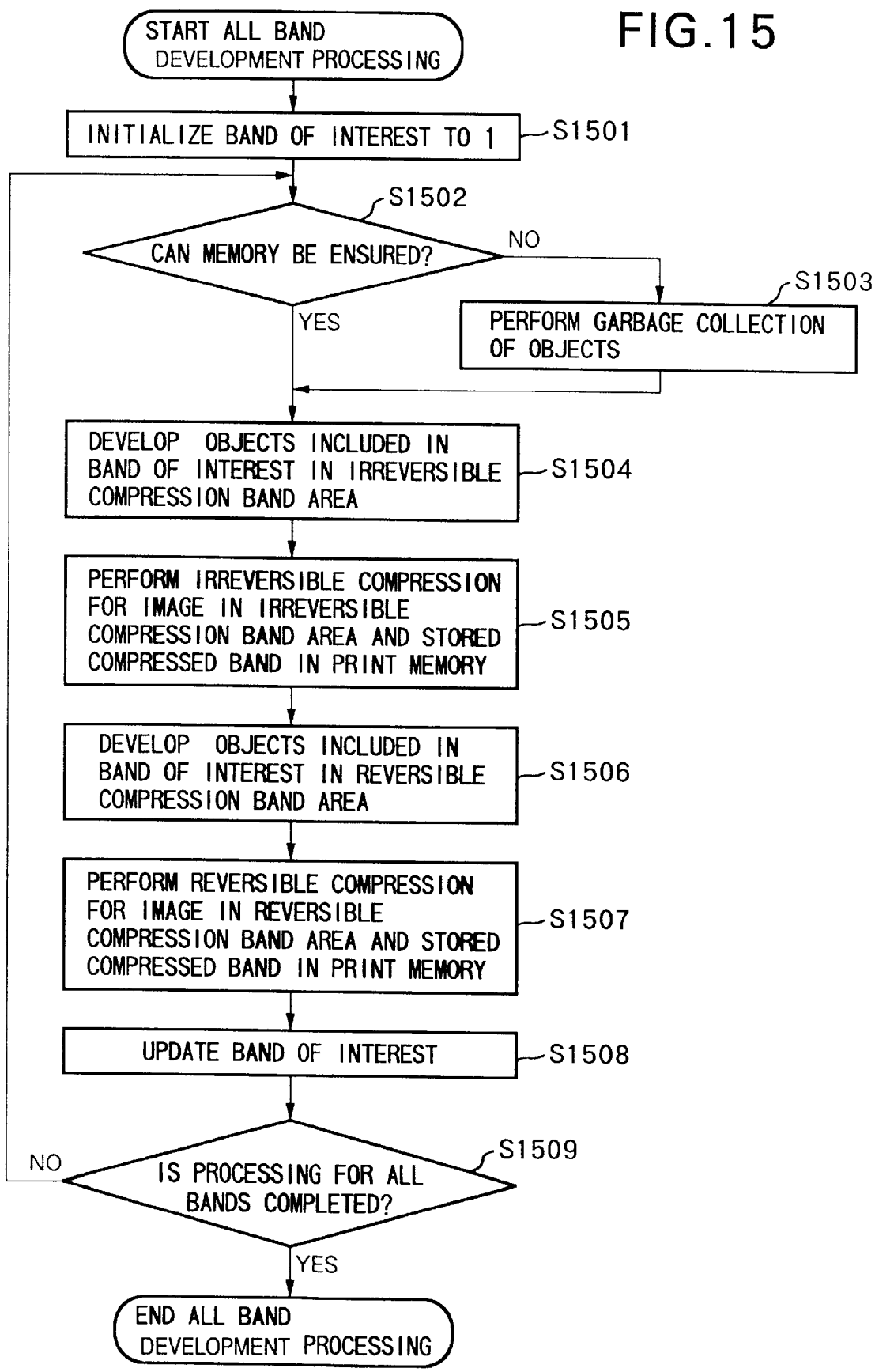
FIG. 15 is a flow chart for explaining processing of developing all bands in the second embodiment.

FIG. 15 is a flow chart for explaining development processing in which when a band for which a development time longer than the time necessary for printing one band is required is generated, the band bitmap image is developed after bitmap image areas for all bands are ensured.

First, a band as a processing target is initialized to the band at the top. In step S1502, it is checked whether the memory for storing compressed data can be ensured. If NO in step S1502, garbage collection of object areas is performed in step S1503. When the memory area is ensured, an object included in the band is developed in the irreversible compression band area in step S1504. In step S1505, irreversible compression such as JPEG is performed for the bitmap image developed in the irreversible band area, and the compressed data is stored on the print memory. Processing in step S1505 is performed by the irreversible band compression unit 1306. In step S1506, an object included in the band is developed in the reversible compression band. In step S1507, reversible compression is performed for the bitmap image developed in the reversible band area, and the compressed data is stored on the print memory.

The above processes are repeated until processing for all the bands is complete in step S1509.

With this processing, the memory space can be effectively used by performing irreversible compression for a multivalued image to increase the compression ratio. For this reason, when processing of the first embodiment is combined with the second embodiment, the number of times of compression processing necessary for ensuring a usable space can be decreased by developing a band bitmap data in a memory space produced by irreversible compression of a multivalued image, resulting in an increase in efficiency of print output.

In this embodiment, multivalued images have priority over binary images. However, binary images may have priority over multivalued images, and a band including a binary image may be classified as a reversible band even when the band also includes a multivalued image. In this case, the compression ratio is not so increased, unlike a case in which multivalued images have priority over binary images, though the quality of the binary images can be improved.

Figure 16:
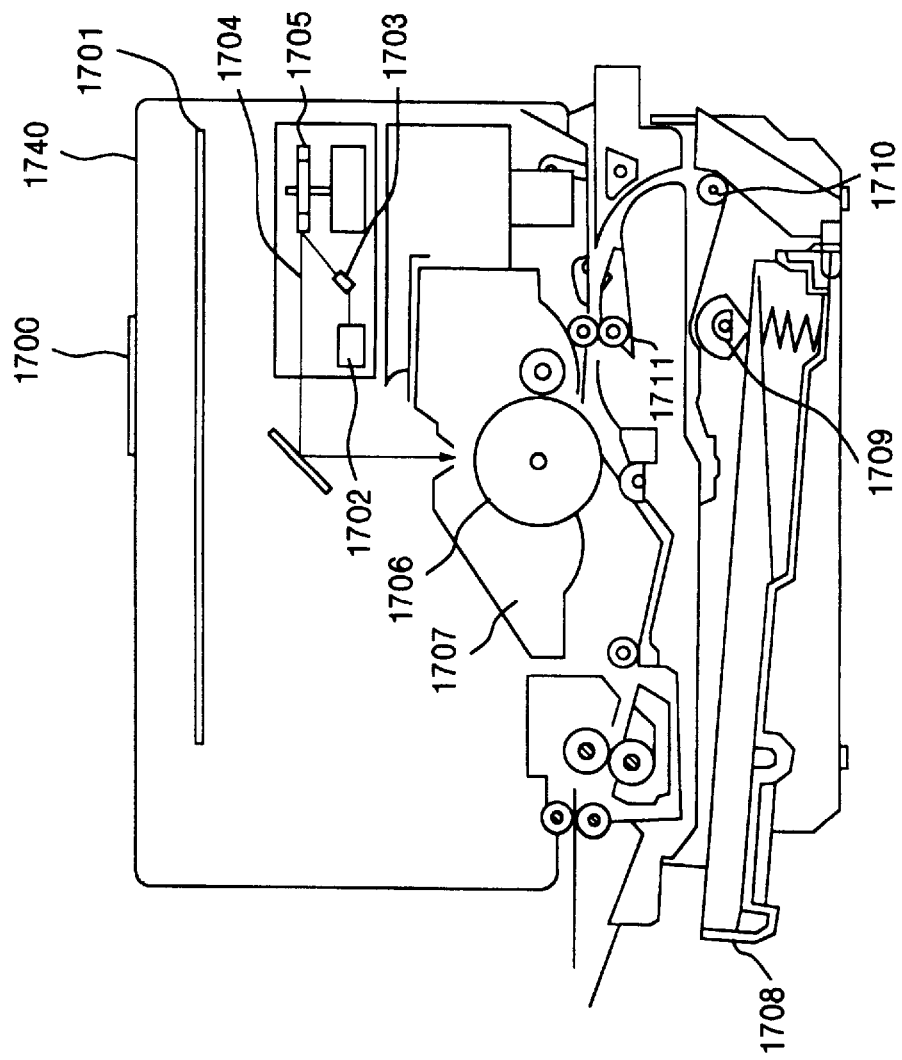
FIG. 16 is a sectional view showing the arrangement of a laser beam printer.

FIG. 16 is a sectional view showing the internal structure of a laser beam printer (to be abbreviated as an LBP hereinafter) as one example of the printer engine 110 of the first embodiment or the printer engine 1310 of the second embodiment. This LBP can receive character pattern data or the like and print the data on a recording paper sheet.

Referring to FIG. 16, reference numeral 1740 denotes an LBP main body which forms an image on a recording paper sheet as a recording medium on the basis of a supplied character pattern or the like. Reference numeral 1700 denotes an operation panel on which switches for the operation and an LED display device are arranged; and 1701, a printer control unit for controlling the entire operation of the LBP 1740 and analyzing character pattern information or the like. The printer control unit 1701 mainly converts character pattern information into a video signal and outputs the video signal to a laser driver 1702.

The laser driver 1702 is a circuit for driving a semiconductor laser 1703. The laser driver 1702 turns on/off a laser beam 1704 emitted from the semiconductor laser 1703 in accordance with the input video signal. The laser beam 1704 is oscillated in the right and left direction by a rotary polygonal mirror 1705 to scan an electrostatic drum 1706. With this operation, a latent image of the character pattern is formed on the electrostatic drum 1706. This latent image is developed by a developing unit 1707 around the electrostatic drum 1706 and transferred to a recording paper sheet. As the recording paper sheet, a cut sheet is used. Cut sheets are stored in a paper cassette 1708 mounted in the LBP 1740, fed into the apparatus by a feed roller 1709 and conveyance rollers 1710 and 1711, and supplied to the electrostatic drum 1706.

As the image forming apparatus of this embodiment, a laser beam printer has been exemplified above. However, the present invention is not limited to this and can also be applied to an ink-jet printer to be described below.

Figure 17:
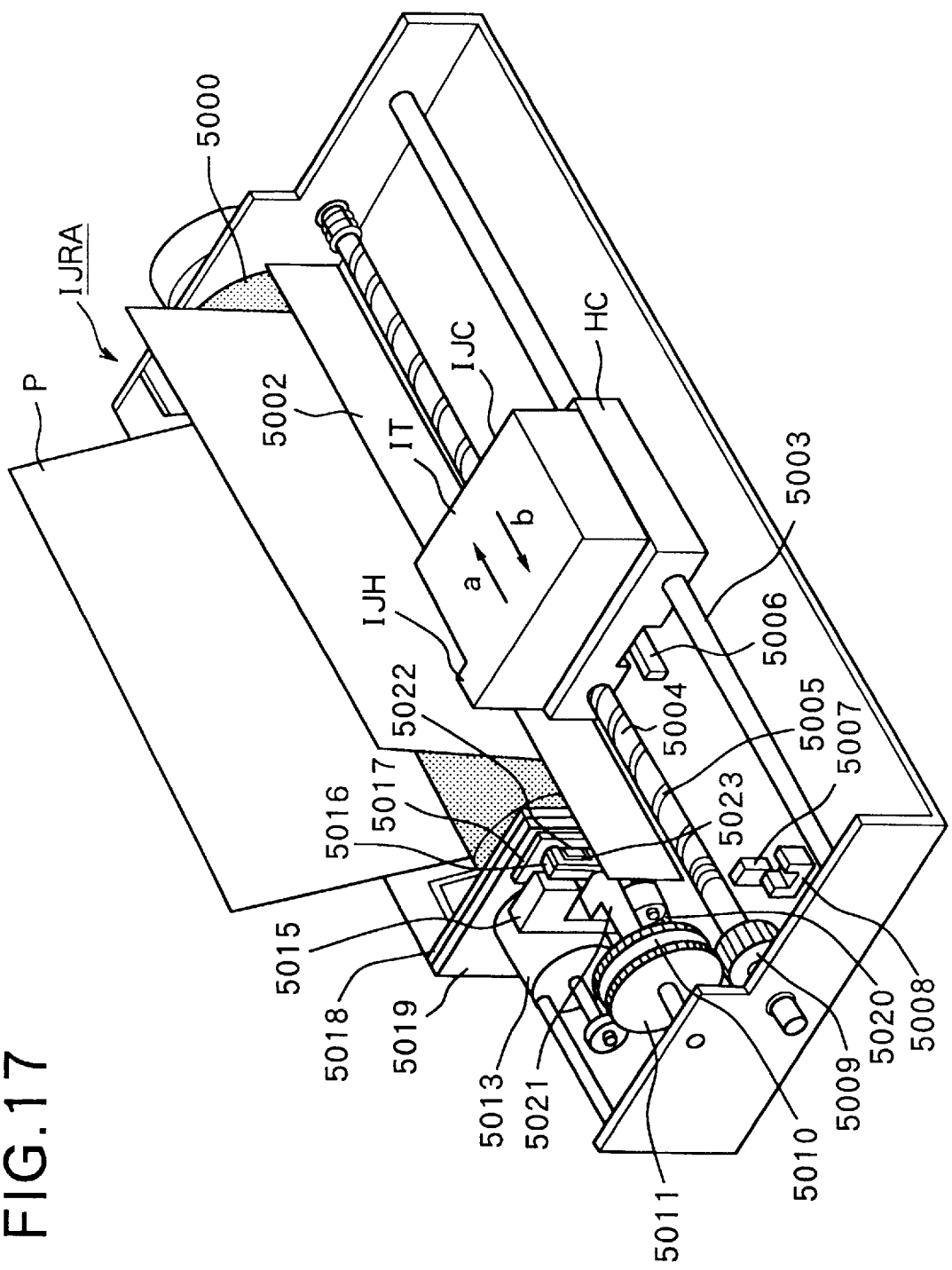
FIG. 17 is a perspective view showing the arrangement of an ink-jet printer.

FIG. 17 is a perspective view of an ink-jet recording apparatus IJRA as a printer engine unit, as in FIG. 16, to which the present invention can be applied. Referring to FIG. 17, a carriage HC engages with a helical groove 5004 of a lead screw 5005 which rotates to be interlocked with the forward/reverse rotation of a drive motor 5013 through driving force transmission gears 5011 and 5009. The carriage HC has a pin (not shown) and reciprocally moves in directions indicated by arrows a and b. An ink-jet cartridge IJC is loaded in the carriage HC. A paper press plate 5002 presses a paper sheet against a platen 5000 along the moving direction of the carriage. Photocouplers 5007 and 5008 serve as home position detection means for confirming the presence of a lever 5006 of the carriage in this region to switch the rotational direction of the drive motor 5013. Reference numeral 5016 denotes a member for supporting a cap member 5022 which covers the front surface of the print head; and 5015, a suction means for drawing the air in the cap. The suction means 5015 performs suction/recovery of the print head through an opening 5023 in the cap. Reference numeral 5017 denotes a cleaning blade. A member 5019 can move this blade in the front-and-rear direction, and these members are supported by a main body support plate 5018. In place of the blade of this form, a known cleaning blade can be applied to this example, as a matter of course. Reference numeral 5021 denotes a lever for starting suction of suction/recovery. The lever 5021 moves in accordance with the movement of a cam 5020 engaging with the carriage, and the transmission of the driving force from the drive motor is controlled by a known transmission means such as clutch switching.

Of these capping, cleaning, and suction/recovery operations, desired processing can be performed at a corresponding position by the function of the lead screw 5005 when the carriage enters the region on the home position side. These operations can be applied to this embodiment as long as a desired operation is performed at a known timing.

[Another Embodiment]

The present invention can be applied to a system constituted by a plurality of devices (e.g., a host computer, an interface device, a reader, and a printer), or to an apparatus comprising a single device (e.g., a copying machine or a facsimile apparatus).

Furthermore, the object of the invention can be attained by supplying, to a system or apparatus, a storage medium in which a program code of software for realizing the function of the above-described embodiment is recorded, reading out the program code stored in the storage medium by the computer (or a CPU or MPU) of the system or apparatus, and executing the program code.

In this case, the program code itself which is read out from the storage medium realizes the function of the above-described embodiments, and the storage medium which stores the program code constitutes the present invention.

As the recording medium for supplying a program code, a floppy disk, a hard disk, an optical disk, a magnetooptical disk, a CD-ROM, a CD-R, a magnetic tape, a nonvolatile memory card, or a ROM can be used.

The present invention incorporates not only a case in which the computer executes the readout program code to realize the function of the above-described embodiments but also a case in which an OS (Operating System) running on the computer performs part or all actual processing to realize the function of the above-described embodiments with the processing.

The present invention also incorporates a case in which the program code read out from the storage medium is written in a memory of a feature expansion board inserted in the computer or a feature expansion unit connected to the computer, and thereafter, a CPU of the feature expansion board or feature expansion unit performs part or all the actual processing to realize the function of the above-described embodiments with the processing.

As has been described above, the image processing apparatus and method according to the present invention can save the time required for compression/expansion and increase the efficiency of print processing in print/output processing of an image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which generates image data of a page in units of bands obtained by dividing said page, comprising:

development means for developing image data of a band of interest and causing storage means having a predetermined memory capacity to store the image data;

compression means for compressing band image data stored in said storage means;

output means for outputting image data of one page, which is stored in said storage means, after image data of all bands included in said page are generated; and wherein said compression means compresses the band image data stored in said storage means until a sufficient capacity is obtained when a usable memory capacity of said storage means is insufficient.

2. The apparatus according to claim 1, wherein said compression means selects, from the band image data stored in said storage means, a band in ascending order of the number of included objects, and compresses image data of said band.

3. The apparatus according to claim 1, further comprising re-development means for overwriting an object on the band image data stored in said storage means, and wherein when the band image data on which said object is to be overwritten is compressed, said re-development means temporarily expands the image data, overwrites said object on the expanded image data, and compresses the band image data, and when the band image data is not compressed, overwrites said object on the image data, and compresses the band image data.

4. The apparatus according to claim 1, wherein said compression means selects a method for compressing image data in accordance with characteristic of the image data.

5. The apparatus according to claim 1, further comprising prediction means for predicting a necessary time for developing the image data in units of bands included in a certain page, and wherein when a band for which the necessary time exceeds a predetermined value is included in said page, image data of said page is stored in said storage means by said development means and said compression means and output by said output means, and otherwise, image area for two bands, which are ensured in said storage means, are alternately used to simultaneously perform development of the image data and output of the developed image data.

6. An image processing method for generating image data of a page in units of bands obtained by dividing said page by using storage means and output means, comprising:

a developing step of printing image data of a band of interest and causing said storage means to store the image data;

a compressing step of compressing band image data stored in said storage means;

an output control step of causing said output means to output image data of one page, which is stored in said storage means, after image data of all bands included in said page are generated; and wherein the band image data stored in said storage means is compressed in the compressing step until a sufficient capacity is obtained when a usable memory capacity of said storage means is insufficient.

7. The method according to claim 6, wherein the compressing step includes the step of selecting, from the band image data stored in said storage means, a band in ascending order of the number of included objects, and compressing image data of said band.

8. The method according to claim 6, further comprising a re-developing step of overwriting an object on the band image data stored in said storage means, and wherein when the band image data on which said object is to be overwritten is compressed, the image data is temporarily expanded, said object is overwritten on the expanded image data, and the band image data is compressed in the re-developing step, and when the band image data is not compressed, said object is overwritten on the image data, and the band image data is compressed in the re-developing step.

9. The method according to claim 6, wherein, in the compressing step, a method for compressing image data is selected in accordance with characteristic of the image data.

10. The method according to claim 6, further comprising the prediction step of predicting a necessary time for developing the image data in units of bands included in a certain page, and wherein when a band for which the necessary time exceeds a predetermined value is included in said page, image data of said page is stored in said storage means in the developing step and the compressing step and output in the output control step, and otherwise, image area for two bands, which are ensured in said storage means, are alternately used to simultaneously perform development of the image data and output of the developed image data.

11. A computer readable memory which stores a program for generating image data of a page in units of bands obtained by dividing said page by using storage means and output means, comprising:

developing code means for printing image data of a band of interest and causing said storage means to store the image data;

compression code means for compressing band image data stored in said storage means;

output control code means of causing said output means to output image data of one page, which is stored in said storage means, after image data of all bands included in said page are generated; and wherein the band image data stored in said storage means is compressed by the compression code means until a sufficient capacity is obtained when a usable memory capacity of said storage means is insufficient.

12. The memory according to claim 11, wherein said compression code means selects, from the band image data stored in said storage means, a band in ascending order of the number of included objects, and compressing image data of said band.

13. The memory according to claim 11, further comprising re-developing code means for overwriting an object on the band image data stored in said storage means, and wherein when the band image data on which said object is to be overwritten is compressed, said re-developing code means temporarily expands the image data, overwrites said object on the expanded image data, and compresses the band image data, and when the band image data is not compressed, overwrites said object on the image data, and compresses the band image data.

14. The memory according to claim 11, wherein, by said compression code means, a method for compressing image data is selected in accordance with a characteristic of the image data.

15. The memory according to claim 11, further comprising prediction code means for predicting a necessary time for developing the image data in units of bands included in a certain page and alternate output code means, and wherein when a band for which the necessary time exceeds a predetermined value is included in said page, image data of said page is stored in said storage means by said developing code means and said compression code means and output by said output control code means, and otherwise, image area for two bands, which are ensured in said storage means, are alternately used to simultaneously perform development of the image data and output of the developed image data by said alternate output code means.

16. An image processing apparatus which generates image data of a page in units of bands obtained by dividing the page, comprising:

first determination means for determining whether or not there is a band, in a page of interest, and whether a predicted time period required for developing image objects exceeds a predetermined time period;

second determination means for determining whether or not a band area for storing uncompressed band image data of a band of interest can be ensured in storage means when there is a band where a predicted time period required for developing image objects exceeds the predetermined time period in the page of interest; and compression means for compressing image data and storing the compressed image data in the storage means when said second determination means determines that the band area for the band of interest can not be ensured in the storage means.

17. The apparatus according to claim 16, further comprising ensuring means for ensuring a band area for storing uncompressed band image data when said second determination means determines that the band area for the band of interest can be ensured in the storage means.

18. The apparatus according to claim 16, further comprising development means for developing band image data of the band of interest from print data and causing the storage means to store the band image data.

19. The apparatus according to claim 18, wherein said second determination means determines whether a band area for storing uncompressed band image data of the band of interest can be ensured in the storage means after deleting image objects from which the band image data has been developed by said development means.

20. The apparatus according to claim 16, further comprising output means for simultaneously performing development of the band image data and output of the developed band image data using two band areas, wherein said output means develops image objects in one of the two band areas in a case where the image objects of the band of interest have not been developed, copies band image data to one of the two band areas in a case where the image objects of the band of interest have been developed, and expands compressed band image data in one of the two band areas in a case where the image objects of the band of interest have been developed and compressed.

21. The apparatus according to claim 16, wherein said compression means compresses image data stored in the storage means until said determination means determines that the band area for the band of interest can be ensured in the storage means.

22. The apparatus according to claim 16, wherein said compression means selects, from the band image data stored in the storage means, a band in ascending order of the number of included objects, and compresses image data of the selected band.

23. The apparatus according to claim 16, further comprising redevelopment means for overwriting an object on the band image data stored in the storage means, wherein, when the band image data on which the object is to be overwritten is compressed, said redevelopment means temporarily expands the image data, overwrites the object on the expanded image data, and compresses the band image data, and when the band image data is not compressed, said redevelopment means overwrites the object on the image data and compresses the band image data.

24. The apparatus according to claim 16, wherein said compression means selects a method for compressing image data in accordance with a characteristic of the image data.

25. An image processing method for generating image data of a page in units of bands obtained by dividing the page, comprising the steps of:

determining whether or not there is a band, in a page of interest, where a predicted time period required for developing image objects exceeds a predetermined time period;

determining whether or not a band area for storing uncompressed band image data of a band of interest can be ensured in storage means when there is a band where a predicted time period required for developing image objects exceeds the predetermined time period in the page of interest; and compressing stored image data and storing the compressed image data in the storage means when it is determined that the band area for the band of interest can not be ensured in the storage means.

26. The method according to claim 25, further comprising a step of ensuring a band area for storing uncompressed band image data when it is determined that the band area for the band of interest can be ensured in the storage means.

27. The method according to claim 25, further comprising steps of:

developing band image data of the band of interest from print data; and causing the storage means to store the band image data.

28. The method according to claim 27, wherein, in said second determining step, it is determined whether or not a band area for storing uncompressed band image data of the band of interest can be ensured in the storage means after deleting image objects from which the band image data has been developed in said developing step.

29. The method according to claim 25, further comprising an output step of simultaneously performing development of the band image data and output of the developed band image data using two band areas ensured in the storage means, wherein, in said output step, image objects are developed in one of the two band areas in a case where the image objects of the band of interest have not been developed, band image data is copied to one of the two band areas in a case where the image objects of the band of interest have been developed, and compressed band image data is expanded in one of the two band areas in a case where the image objects of the band of interest have been developed and compressed.

30. The method according to claim 25, wherein, in said compressing step, image data stored in the storage means is compressed until it is determined in said determining step that the band area for the band of interest can be ensured in the storage means.

31. The method according to claim 25, wherein, in said compressing step, a band is selected from the band image data stored in the storage means, in ascending order of the number of included objects, and image data of the band is compressed.

32. The method according to claim 25, further comprising a redeveloping step of overwriting an object on the band image data stored in the storage means, wherein when the band image data on which the object is to be overwritten is compressed, in said redeveloping step, the image data is temporarily expanded, the object is overwritten on the expanded image data, and the band image data is compressed, and when the band image data is not compressed, the object is overwritten on the image data, and the band image data is compressed.

33. The method according to claim 26, wherein, in said compressing step, a method for compressing image data is selected in accordance with a characteristic of the image data.

34. A computer readable storage medium which stores a program for generating image data of a page in units of bands obtained by dividing the page, the program comprising instructions for:

determining whether or not there is a band, in a page of interest, where a predicted time period required for developing image objects exceeds a predetermined time period;

determining whether or not a band area for storing uncompressed band image data of a band of interest can be ensured in storage means when there is a band where a predicted time period required for developing image objects exceeds the predetermined time period in the page of interest; and compressing stored image data and storing the compressed image data in the storage means when it is determined that the band area for the band of interest can not be ensured in the storage means.

35. The storage medium according to claim 34, wherein said program further comprises instructions for ensuring a band area for storing uncompressed band image data when it is determined that the band area for the band of interest can be ensured in the storage means.

36. The storage medium according to claim 34, wherein said program further comprises instructions for:

developing band image data of the band of interest from print data; and causing the storage means to store the band image data.

37. The storage medium according to claim 36, wherein said second determining instructions determine whether or not a band area for storing uncompressed band image data of the band of interest can be ensured in the storage means after deleting the image objects from which the band image data has been developed by said developing instructions.

38. The storage medium according to claim 34, wherein said program further comprises output instructions for simultaneously performing development of the band image data and output of the developed band image data using two band areas ensured in the storage means, wherein in said output instructions, image objects are developed in one of the two band areas in a case where the image objects of the band of interest have not been developed, band image data is copied to one of the two band areas in a case where the image objects of the band of interest have been developed, and compressed band image data is expanded in one of the two band areas in a case where the image objects of the band of interest have been developed and compressed.

39. The storage medium according to claim 34, wherein said compressing instructions include instructions to cause image data stored in the storage means to be compressed until it is determined by said determining instructions that the band area for the band of interest can be ensured in the storage means.

40. The storage medium according to claim 34, wherein in said compressing instructions include instructions to cause a band to be selected from the band image data stored in the storage means, in ascending order of the number of included objects, and image data of the band is compressed.

41. The storage medium according to claim 34, wherein said program further comprises redeveloping instructions for overwriting an object on the band image data stored in the storage means, wherein when the band image data on which the object is to be overwritten is compressed, in said redeveloping processing step, the image data is temporarily expanded, the object is overwritten on the expanded image data, and the band image data is compressed, and when the band image data is not compressed, the object is overwritten on the image data, and the band image data is compressed.

42. The storage medium according to claim 34, wherein in said compressing instructions include instructions to cause a method for compressing image data to be selected in accordance with a characteristic of the image data.

* * * * *

UNITED STATES PATENT AND TRADEMARK OFFICE
CERTIFICATE OF CORRECTION

PATENT NO. : 5,870,534

DATED : February 9, 1999

INVENTOR(S) : NAOKI TSUCHITOI

It is certified that error appears in the above-identified patent and that said Letters Patent is hereby corrected as shown below:

COLUMN 6

Line 20, "perform" should be deleted.

COLUMN 9

Line 10, "a" should read --an--.

Line 13, "a" (second occurrence) should read --an--.

Line 32, "a" should read --an--.

COLUMN 12

Line 2, "means;" should read --means; and--.

Line 46, "means;" should read --means; and--.

UNITED STATES PATENT AND TRADEMARK OFFICE
CERTIFICATE OF CORRECTION

PATENT NO.    : 5,870,534

DATED         : February 9, 1999

INVENTOR(S) : NAOKI TSUCHITOI

It is certified that error appears in the above-identified patent and that said Letters Patent is hereby corrected as shown below:

<u>COLUMN 13</u>

Line 24, "means;" should read --means; and--.

Signed and Sealed this

Twenty-eighth Day of December, 1999

Attest:

Q. TODD DICKINSON

*Attesting Officer*          *Acting Commissioner of Patents and Trademarks*